(12) United States Patent
DuBois et al.

(10) Patent No.: US 6,508,117 B1
(45) Date of Patent: Jan. 21, 2003

(54) THERMALLY BALANCED MASS AIR FLOW SENSOR

(75) Inventors: Paul L. DuBois, Flint, MI (US); Dan H. Emmert, Grand Blanc, MI (US); Gregory P. Gee, Waterford, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/903,922

(22) Filed: Jul. 12, 2001

(51) Int. Cl.[7] ............................................. G01F 1/68
(52) U.S. Cl. ............................ 73/204.26; 73/204.15
(58) Field of Search .................... 73/204.26, 204.25, 73/204.23, 204.15

(56) References Cited

U.S. PATENT DOCUMENTS

| | | | | |
|---|---|---|---|---|
| 4,576,050 A | | 3/1986 | Lambert ................... | 73/861.05 |
| 4,888,988 A | | 12/1989 | Lee et al. ................. | 73/204.26 |
| 5,069,066 A | * | 12/1991 | Djorup .................... | 73/204.15 |
| 5,094,105 A | | 3/1992 | Emmert, Jr. et al. ..... | 73/204.25 |
| 5,243,858 A | | 9/1993 | Erskine et al. ........... | 73/204.26 |
| 5,263,380 A | | 11/1993 | Sultan et al. ............. | 73/204.26 |
| 5,375,466 A | * | 12/1994 | Konzelmann ............. | 73/204.26 |
| 5,383,357 A | | 1/1995 | Doll ......................... | 73/118.2 |
| 5,461,910 A | * | 10/1995 | Hodson et al. ........... | 73/204.16 |
| 5,629,481 A | | 5/1997 | Sultan ...................... | 73/204.18 |
| 5,631,417 A | | 5/1997 | Harrington et al. ....... | 73/204.26 |
| 5,656,938 A | * | 8/1997 | Bennohr et al. .......... | 73/204.19 |
| 5,705,745 A | | 1/1998 | Treutler et al. ........... | 73/204.26 |
| 5,780,173 A | | 7/1998 | Harrington et al. ....... | 428/661 |
| 5,804,147 A | | 9/1998 | Blanchet et al. ......... | 422/171 |
| 5,827,960 A | | 10/1998 | Sultan et al. ............. | 73/204.26 |

* cited by examiner

*Primary Examiner*—Harshad Patel
(74) *Attorney, Agent, or Firm*—Vincent A. Cichosz

(57) ABSTRACT

A bi-directional mass air flow sensing device for measuring air flow, comprising a bridge circuit coupled across a voltage potential, wherein the bridge circuit comprises a first side including first and second temperature dependent sensor resistors connected in series and disposed on a thermally insulative substrate window in line with an air flow and arranged such that relative to a first direction of air flow, the first sensor resistor is upstream of the second sensor resistor, and a second side in parallel with the first side and including third and fourth temperature dependent sensor resistors connected in series and disposed on the thermally insulative substrate in line with the air flow such that relative to the first direction of air flow, the third sensor resistor is upstream of the fourth sensor resistor, and a temperature dependent balance resistor connected between the first and second temperature dependent sensor resistors on the first side of the bridge circuit.

16 Claims, 2 Drawing Sheets

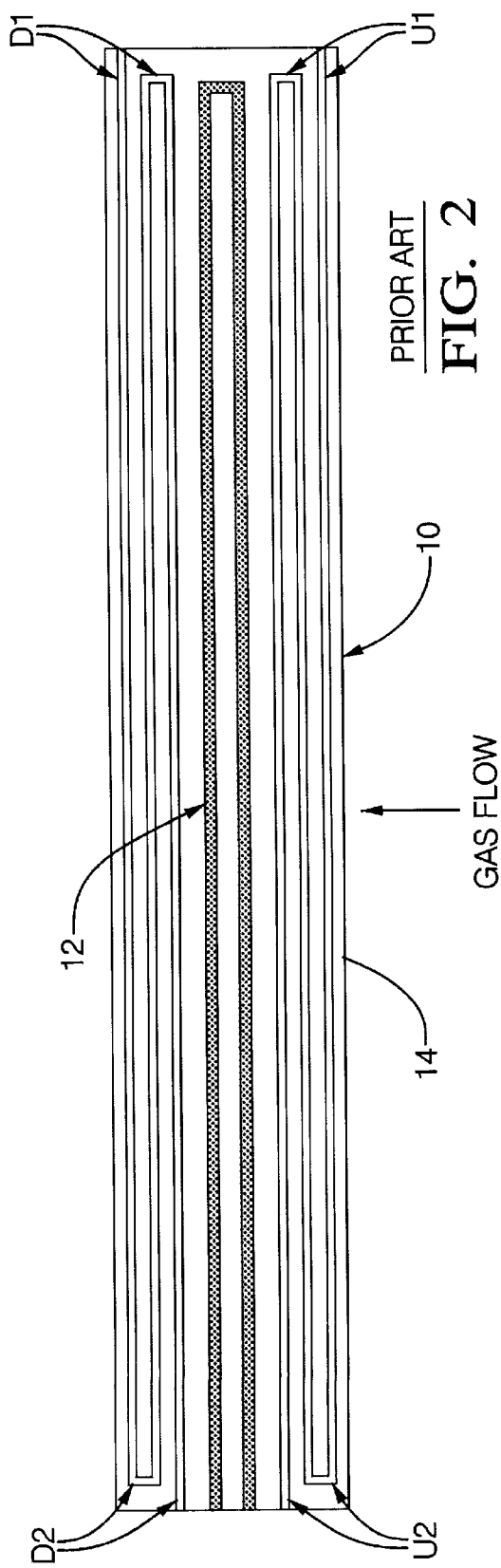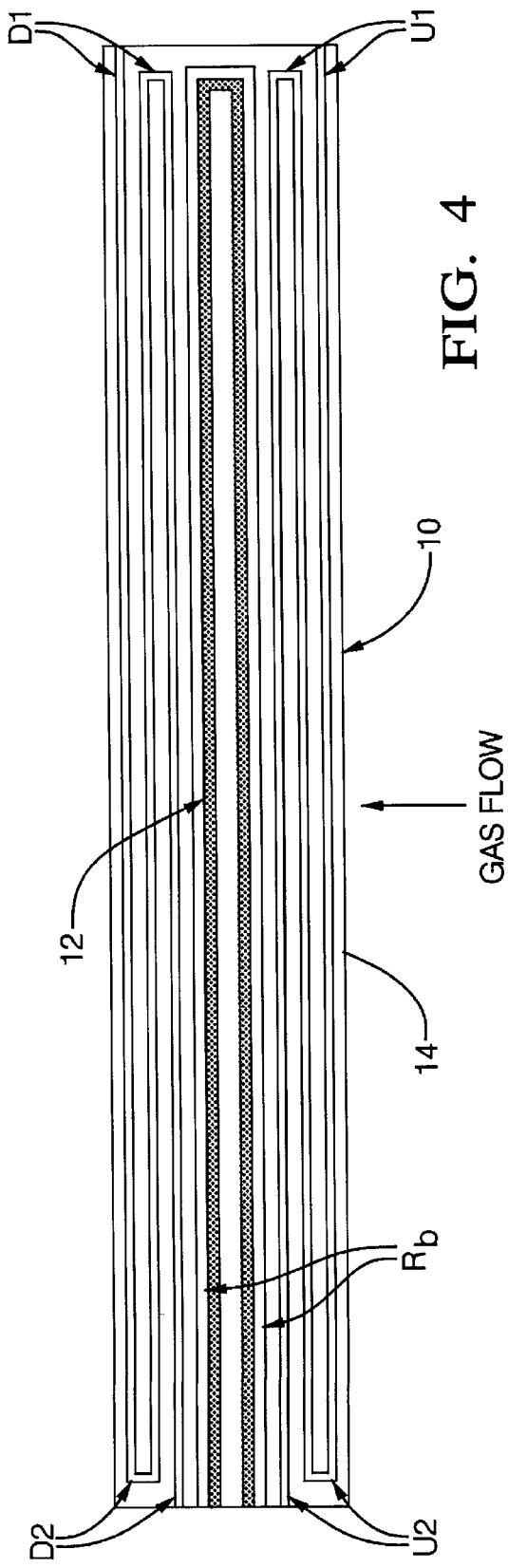

THERMALLY BALANCED MASS AIR FLOW SENSOR

BACKGROUND OF THE INVENTION

The advantage of using electronic rather than mechanical fuel management systems has been recognized by the automotive industry. With such electronic fuel management, it is required to generate and provide mass airflow data to the control system to regulate the appropriate fuel/air combustion ratio. In order to accomplish precise fuel control in an automotive internal combustion engine, mass air flow data is determined through utility of a mass air flow sensing device positioned upstream of the intake manifold of the engine. In an engine with pulsing or reversing flow, the fuel management is improved if the sensing device is a bi-directional mass air flow (BAM) sensor to be able to measure both in-flow and out-flow of air, so that errors due to monitoring flow reversals in the manifold can be avoided.

A typical bi-directional mass air flow sensor generally consists of a thin film heater element and four thin-film sensor resistors on a thin membrane of glass on top of a substrate. The heater element and sensor resistors typically are formed of platinum (Pt), and the substrate typically is a micromachined silicon wafer. The sensor resistors are connected in a Wheatstone bridge circuit configuration to convert the sensed temperature difference into a corresponding voltage. The substrate material is removed from a small area beneath the heater element and the sensor resistors, and left under the area of the sensor containing the interconnects and mechanical support. The glass over the area where the substrate has been removed commonly is referred to as the "window". The heater element is energized to produce a temperature at the center of the window that is considerably higher than ambient temperature; this arrangement results in a temperature gradient from the center of the window to the edges of the window. The high thermal coefficient of resistance (TCR) of the thin-film resistor material causes the resistance of the sensor resistors to change in proportion to the temperature change in the area of the window containing the sensor resistors. With proper calibration of the sensor, a gas caused to flow across the sensor, perpendicular to the length of the sensor resistors, will cause the temperature gradient on each side of the heater element to change in a manner that allows the direction and mass flow rate of the gas flow to be determined.

However, a bi-directional mass air flow sensor must be thermally balanced in the center of the window, or the sensor output will drift with time at low flow rates. By the term "thermal balance" it is meant that the temperature gradient must not change with time for a consistent air flow, or, that the change in gradient on one side of the sensor is cancelled by a compensating change on the other side of the sensor. Previous methods attempting to achieve this required thermal balance have included the addition of a metal framing around and extending over the edge of the window, as well as techniques to place an etch stop into the silicon substrate to define the edge of the window.

SUMMARY OF THE INVENTION

Now, according to the present invention, a novel circuit arrangement is provided for thermally balancing a bi-directional mass airflow sensing device. The invention provides for a bi-directional mass air flow sensing device for measuring air flow, comprising a bridge circuit coupled across a voltage potential, wherein the bridge circuit comprises: a first side including first and second temperature dependent sensor resistors connected in series and disposed on a thermally insulative substrate window in line with an air flow and arranged such that relative to a first direction of air flow, the first sensor resistor is upstream of the second sensor resistor; a second side in parallel with the first side and including third and fourth temperature dependent sensor resistors connected in series and disposed on the thermally insulative substrate in line with the air flow such that relative to the first direction of air flow, the third sensor resistor is upstream of the fourth sensor resistor; and, a temperature dependent balance resistor connected between the first and second temperature dependent sensor resistors on the first side of the bridge circuit.

The balance resistor physically is positioned between the heater and the contiguous sensor resistors on the sensor window, and, electrically is connected between upstream and downstream sensor resistors on one side of the Wheatstone bridge circuit. A shunt resistor may be placed in parallel with the balance resistor. In this arrangement, some of the current that normally would flow through the balance resistor now flows through the shunt resistor. If the voltage across the bridge circuit remains the same, then changing the amount of current flow through the bridge changes the total resistance as measured externally. If the shunt resistor is divided into two separate resistors, then the change in TCR can be adjusted differently for the upstream and downstream sensor resistors on one side of the bridge circuit.

BRIEF DESCRIPTION OF THE DRAWINGS

Referring now to the drawings in which like elements are numbered alike, and wherein:

FIG. 2 illustrates a sensor topology according to the prior art;

DESCRIPTION OF A PREFERRED EMBODIMENT

Figure 1:
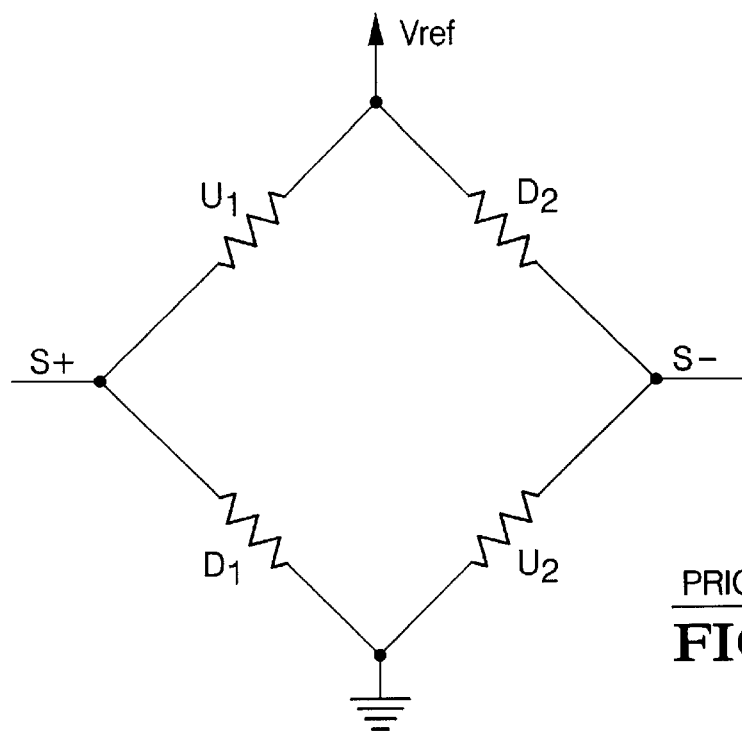
FIG. 1 depicts a bridge circuit for a bi-directional mass air flow sensor device according to the prior art.

A typical bi-directional mass air flow sensor device generally comprises a thin film platinum heating elements and four thin film platinum film sensor resistors (two separate pairs of upstream and downstream sensor elements) on a thin glass membrane on the surface of a micromachined silicon substrate. As depicted in FIG. 1, the sensor resistors ($U_1$, $D_1$, $U_2$, and $D_2$) are connected in a Wheatsone bridge configuration, wherein resistors $U_1$ and $U_2$ are on the upstream side of the heater element (relative to a unidirectional air flow), and resistors $D_1$ and $D_2$ are located on the downstream side of the heater element. $V_{ref}$ is the reference voltage, and $S^-$ and $S^+$ are the outputs of the bridge circuit.

As illustrated in FIG. 2, the silicon typically is moved from a small area 10 of the substrate under the heater element 12 and sensor resistors $D_1$, $D_2$, $U_1$, and $U_2$. The silicon substrate is left in place under the area of the substrate containing the interconnects and mechanical support (not shown) The membrane of glass remaining in the area 10 where the silicon substrate has been removed is referred to as the "window" 14.

In the operation of the sensor, the heater element 12 is energized to produce a temperature at the center of window 14 that is considerably higher than ambient temperature. A temperature gradient thus is produced from the center of window 14 to its edges. The sensor resistors $D_1$, $D_2$, $U_1$, and $U_2$, preferably made of platinum, feature a high resistance dependency on temperature, a high thermal coefficient of resistance (TCR), preferably from about 3000 ppm/° C. to about 3800 ppm/° C., and, accordingly, the resistance of the sensor resistors is caused to change in proportion of the temperature change in the area of the window containing the sensor resistors. With appropriate calibration, a gas flowing across the sensor in a perpendicular direction to the length of the sensor resistors $D_1$, $D_2$, $U_1$, and $U_2$ will cause the temperature gradient on each side of heater 12 to change in a manner that allows the direction and mass flow rate of the gas flow to be determined.

To prevent the sensor output from drifting with time, the sensor is thermally balanced in the center of the window by the incorporation of a balance resistor on the sensor window. As depicted in the circuit schematic of FIG. 3, a balance resistor $R_b$ physically is positioned between the heater and the sensor resistors $D_1$, $D_2$, $U_1$, and $U_2$. Balance resistor $R_b$ is connected electrically between the upstream and downstream sensor resistors on one side of the bridge circuit, shown in FIG. 3 with the balance resistor $R_b$ connected between upstream sensor resistor $U_1$, and downstream sensor resistor $D_1$. A shunt resistor $R_s$ (shown divided into two shunt resistor components $R_{s1}$ and $R_{s2}$) is placed in parallel with the balance resistor $R_b$.

The shunt resistor $R_s$ ($R_s = R_{s1} + R_{s2}$) is located off the sensor window and is made of a low TCR material, such as carbon film or metal glaze, preferably having a TCR in the range about +/−200 ppm/° C.

The physical layout of the sensor topology is illustrated in FIG. 4. The overall bi-directional mass flow air meter sensor, which may, for example, be about 2 mm to about 3 mm wide, or so, and about 4 mm to about 8 mm long, includes a thin window 14, comprised typically of a thin, dielectric, thermally insulative glass material, such as silicon dioxide and/or silicon nitride, having a thickness of about 1 mm to about 2 mm. In fabricating the sensor, window 14 is defined by etching from the backside of the silicon substrate wafer an area 10 on which the dielectric glass, the heater element 12, and sensor resistors $D_1$, $D_2$, $U_1$, and $U_2$ can be deposited and formed. The window area 10 generally measures about 0.2 mm to about 0.6 mm wide and about 1.5 mm to about 3.0 mm long. The heater element and sensor resistors typically are patterned and etched from a common metal layer on top of the dielectric layer. The metal should feature high thermal coefficient of resistance; platinum is a preferred material. As noted in FIG. 4, balance resistor $R_b$ is positioned between the heater element 12 and the sensor resistors $D_1$, $D_2$, $U_1$, and $U_2$.

Figure 3:
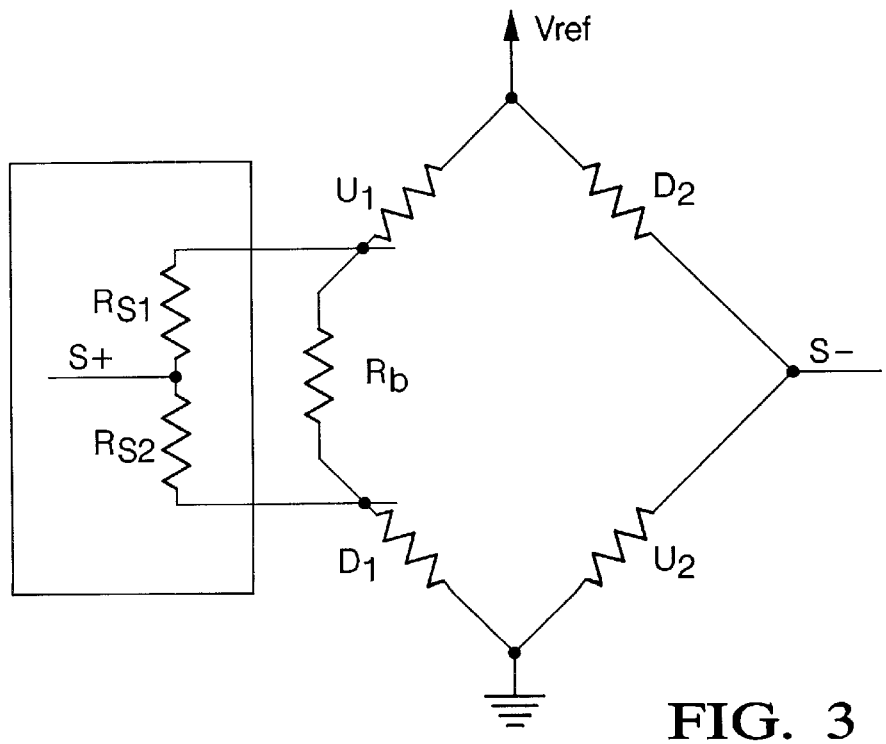
FIG. 3 depicts a preferred bridge circuit for a bi-directional mass air flow sensor device; and, FIG. 4 illustrates a preferred sensor topology.

The effective TCR of the sensor resistors $U_1$, and $D_1$ can thus be modified. This effect occurs because some of the current which normally would flow through the balance resistor $R_b$ now flows through the shunt resistor $R_s$. If the voltage across the bridge remains the same, then, changing the amount of current flow through the bridge changes the total resistance as measured externally. If the shunt resistor $R_s$ is divided into two resistors, $R_{s1}$ and $R_{s2}$ as shown in FIG. 3, then the change in TCR can be adjusted differently for sensor resistors $U_1$ and $D_1$.

The adjustment of TCR for sensor resistors $U_1$ and $D_1$ can be illustrated by the following analysis. First, the bridge circuit, effectively the same as that represented in FIG. 3, is redefined by replacing upstream sensor resistors $U_1$, downstream resistor $D_1$, balance resistor $R_b$, and shunt resistors $R_{s1}$, and $R_{s2}$ with effective upstream resistor $U_{1eff}$ and effective downstream resistor $D_{1eff}$, such that:

$$U_{1eff} = (V_{ref} - S^+)/I \quad (A)$$

where I is the current through $U_1$ and $D_1$ $$D_{1eff} = (S+)/I \quad (B)$$

Solving the equation to find $U_{1eff}$ and $D_{1eff}$, based only on $U_1$, $D_1$, $R_b$, $R_{s1}$, $R_{rs}$ and $R_s$ yields:

$$U_{1eff} = U_1 + R_b \cdot R_{s1}/(R_s + R_b) \quad (C)$$

$$D_{1eff} = D_1 + R_b \cdot R_{s2}/(R_s + R_b) \quad (D)$$

then, the temperature dependence of the platinum resistors are defined as:

$$R = R_o(1 + aT) \quad (E)$$

where $R_o$ is the resistance at zero degrees Celsius (0° C.), a is a constant and T is the temperature in ° C.

Replacing the resistor values in equations (C) and (D) with their equivalent temperature dependent forms from equation (E) yields the equations:

$$U_{1oeff} = U_{1o} + R_{bo} \cdot R_{s1}/(R_s + R_{bo}(1 + a \cdot T)) \quad (F)$$

$$D_{1oeff} = D_{1o} + R_{bo} \cdot R_{s2}/(R_s + R_{bo}(1 + a \cdot T)) \quad (G)$$

From equations (F) and (G), it can be seen that the temperature dependence of the upstream sensor resistor $U_1$ and downstream sensor resistor $D_1$ is modified as if the 0° C. value of the resistor is now reduced with increasing temperature. This means that the effective resistance of the upstream sensor resistor $U_{1eff}$ and the downstream sensor resistor $D_{1eff}$ will vary less with temperature than the base sensor resistors $U_1$ and $D_1$.

Further, it is evident from the analysis that by decreasing the ratio of $R_{s1}$ to $R_s$ towards 0, the effect of the modification of the temperature dependence is that $U_{1eff}$ approaches $U_1$. The same interpretation can be stated in regard to the relationship of $D_{1eff}$, $D_1$, and the ratio of $R_{s2}$ and $R_s$.

It also is evident from the equations that as the total shunt resistance ($R_s$) is made very large, the effect of the temperature dependence of $U_{1oeff}$ and $D_{1oeff}$ is reduced to 0, since $R_s$ become much larger than $R_{bo} \cdot (1 + aT)$.

It equally is evident that as $R_s$ becomes small, that the effect of the temperature dependence also is reduced to 0, since the balance of $R_{s1}$ will become small and the ratio in the equation also will become small (since $R_s = R_{s1} + R_{s2}$, so that $R_s$ always is more than or equal to $R_{s1}$).

This sensor, for example, effectively may be utilized for determining mass air flow in an arrangement wherein the sensing device is disposed in an air flow channel of an electronic fuel management control system such that air is flowing across the sensor window from the bottom of the sensor to the top of the sensor (as seen in FIG. 4). A predetermined current is passed through heating element 12, causing it to become heated and propagate such heat upstream and downstream to adjacent sensor elements $D_1$, $D_2$, $U_1$, and $U_2$ which in turn become heated. When there is an air flow, the temperature of the upstream sensors are cooled more vigorously than the downstream sensors. As shown and described above, the disclosed sensing device circuit arrangement accomplishes thermal balance in the center of the sensor window, is not influenced by the dimensions of the window, and the output of the sensing device is prevented from drifting over time.

It will be understood that a person skilled in the art may make modifications to the preferred embodiment shown herein within the scope and intent of the claims. While the present invention has been particularly described as being carried out in a specific manner, it is intended not to be limited thereby and rather cover the invention broadly within the scope and spirit of the claims.

We claim:

1. A bi-directional mass air flow sensing device for measuring air flow, comprising:
    a bridge circuit coupled across a voltage potential, wherein said bridge circuit comprises
        (a) a first side including first and second temperature dependent sensor resistors connected in series and disposed on a thermally insulative substrate window in line with an air flow and arranged such that relative to a first direction of air flow, the first sensor resistor is upstream of the second sensor resistor, and
        (b) a second side in parallel with the first side and including third and fourth temperature dependent sensor resistors connected in series and disposed on the thermally insulative substrate in line with the air flow such that relative to the first direction of air flow, the third sensor resistor is upstream of the fourth sensor resistor, and
        (c) a temperature dependent balance resistor connected between the first and second temperature dependent sensor resistors on the first side of the bridge circuit.

2. The bi-directional mass air flow sensing device of claim 1 wherein the sensor resistors comprise a material having a high resistance dependency on temperature.

3. The bi-directional mass air flow sensing device of claim 2 wherein the sensor resistors comprise a platinum material.

4. A bi-directional mass air flow sensing device for measuring air flow, comprising:
    a bridge circuit coupled across a voltage potential, wherein said bridge circuit comprises
        (a) a first side including first and second temperature dependent sensor resistors connected in series and disposed on a thermally insulative substrate window in line with an air flow and arranged such that relative to a first direction of air flow, the first sensor resistor is upstream of the second sensor resistor, and
        (b) a second side in parallel with the first side and including third and fourth temperature dependent sensor resistors connected in series and disposed on the thermally insulative substrate in line with the air flow such that relative to the first direction of air flow, the third sensor resistor is upstream of the fourth sensor resistor,
        (c) a temperature dependent balance resistor connected between the first and second temperature dependent sensor resistors on the first side of the bridge circuit; and
    wherein said bridge circuit includes a shunt resistor placed in parallel only with said balance resistor.

5. The bi-directional mass air flow sensing device of claim 4 wherein the shunt resistor is positioned off the thermally insulative substrate window.

6. The bi-directional mass air flow sensing device of claim 5 wherein the shunt resistor comprises a material having a low thermal coefficient of resistance as compared to the material of the sensor resistors.

7. A bi-directional mass air flow sensing device for measuring air flow, comprising:
    a bridge circuit coupled across a voltage potential, wherein said bridge circuit comprises
        (a) a first side including first and second temperature dependent sensor resistors connected in series and disposed on a thermally insulative substrate window in line with an air flow and arranged such that relative to a first direction of air flow, the first sensor resistor is upstream of the second sensor resistor, and
        (b) a second side in parallel with the first side and including third and fourth temperature dependent sensor resistors connected in series and disposed on the thermally insulative substrate in line with the air flow such that relative to the first direction of air flow, the third sensor resistor is upstream of the fourth sensor resistor,
        (c) a temperature dependent balance resistor connected between the first and second temperature dependent sensor resistors on the first side of the bridge circuit; and
    wherein said bridge circuit includes a shunt resistor placed in parallel only with said balance resistor, wherein said shunt resistor comprises two separate resistor components.

8. A bi-directional mass air flow sensing device for measuring air flow, comprising:
    a bridge circuit coupled across a voltage potential, wherein said bridge circuit comprises
        (a) a first side including first and second temperature dependent sensor resistors connected in series and disposed on a thermally insulative substrate window in line with an air flow and arranged such that relative to a first direction of air flow, the first sensor resistor is upstream of the second sensor resistor, and
        (b) a second side in parallel with the first side and including third and fourth temperature dependent sensor resistors connected in series and disposed on the thermally insulative substrate in line with the air flow such that relative to the first direction of air flow, the third sensor resistor is upstream of the fourth sensor resistor,
        (c) a temperature dependent balance resistor connected between the first and second temperature dependent sensor resistors on the first side of the bridge circuit; and
    wherein the sensor resistors are disposed on said substrate window, wherein said substrate window includes a thermally insulative glass material.

9. The bi-directional mass air flow sensing device of claim 8, wherein the thermally insulative glass material is selected from the group consisting of silicon dioxide, silicon nitride, and combinations thereof.

10. A bi-directional mass air flow sensing device for measuring air flow, comprising:
    a bridge circuit coupled across a voltage potential, wherein said bridge circuit comprises
        (a) a first side including first and second temperature dependent sensor resistors connected in series and disposed on a thermally insulative substrate window in line with an air flow and arranged such that relative to a first direction of air flow, the first sensor resistor is upstream of the second sensor resistor, and
        (b) a second side in parallel with the first side and including third and fourth temperature dependent sensor resistors connected in series and disposed on the thermally insulative substrate in line with the air flow such that relative to the first direction of air flow, the third sensor resistor is upstream of the fourth sensor resistor,
        (c) a temperature dependent balance resistor connected between the first and second temperature dependent sensor resistors on the first side of the bridge circuit; and a heater element disposed so as to separate said first and third sensor resistors from said second and fourth sensor resistors.

11. The bi-directional mass air flow sensing device of claim 10 wherein the heater element comprises a material having a high resistance dependency on temperature.

12. The bi-directional mass air flow sensing device of claim 11 wherein the heater element comprises a platinum material.

13. A bi-directional mass air flow sensing device for measuring air flow, comprising:

a bridge circuit coupled across a voltage potential, wherein said bridge circuit comprises
- (a) a first side including first and second temperature dependent sensor resistors connected in series and displaced on a thermally insulative glass substrate window in line with an air flow and arranged such that relative to a first direction of air flow, the first sensor resistor is upstream of the second sensor resistor, and
- (b) a second side in parallel with the first side and including third and fourth temperature dependent sensor resistors connected in series and disposed on the thermally insulative substrate in line with the air flow such that relative to the first direction of air flow, the third sensor resistor is upstream of the fourth sensor resistor,
- (c) a heater element disposed so as to separate said first and third sensor resistors from said second and fourth sensor resistors,
- (d) a temperature dependent balance resistor connected between the first and second temperature dependent sensor resistors on the first side of the bridge circuit, and
- (e) a shunt resistor placed in parallel with said balance resistor.

14. A method of balancing the drift of a bi-directional mass air flow sensing device for measuring air flow, comprising a bridge circuit coupled across a voltage potential, wherein said bridge circuit comprises a first side including first and second temperature dependent sensor resistors connected in series and displaced on a thermally insulative glass substrate window in line with an air flow and arranged such that relative to a first direction of air flow, the first sensor resistor is upstream of the second sensor resistor, and a second side in parallel with the first side and including third and fourth temperature dependent sensor resistors connected in series and disposed on the thermally insulative substrate in line with the air flow such that relative to the first direction of air flow, the third sensor resistor is upstream of the fourth sensor resistor, and a heater element positioned between upstream first and third sensor resistors and second and fourth downstream resistors, comprising:

determining values of a temperature dependent balance resistor and a shunt resistor, wherein said balance resistor and said shunt resistor have been selected so as to achieve a desired thermal coefficient of resistance of said first sensor resistor, said second sensor resistor, said third sensor resistor and said fourth sensor resistor;

electrically connecting said temperature dependent balance resistor between the first and second temperature dependent sensor resistors on the first side of the bridge circuit;

electrically connecting said shunt resistor in parallel with said balance resistor; and applying power to said sensing device so as to balance the drift of said sensing device.

15. The method of claim 14 wherein said shunt resistor is divided into two shunt resistor elements.

16. The method of claim 14 wherein said shunt resistor is positioned off of the thermally insulative substrate window.

* * * * *